May 10, 1938.  D. W. OSWALT  2,117,008
SUPPORT FOR DREDGING CONDUITS
Filed Jan. 5, 1938  2 Sheets-Sheet 2
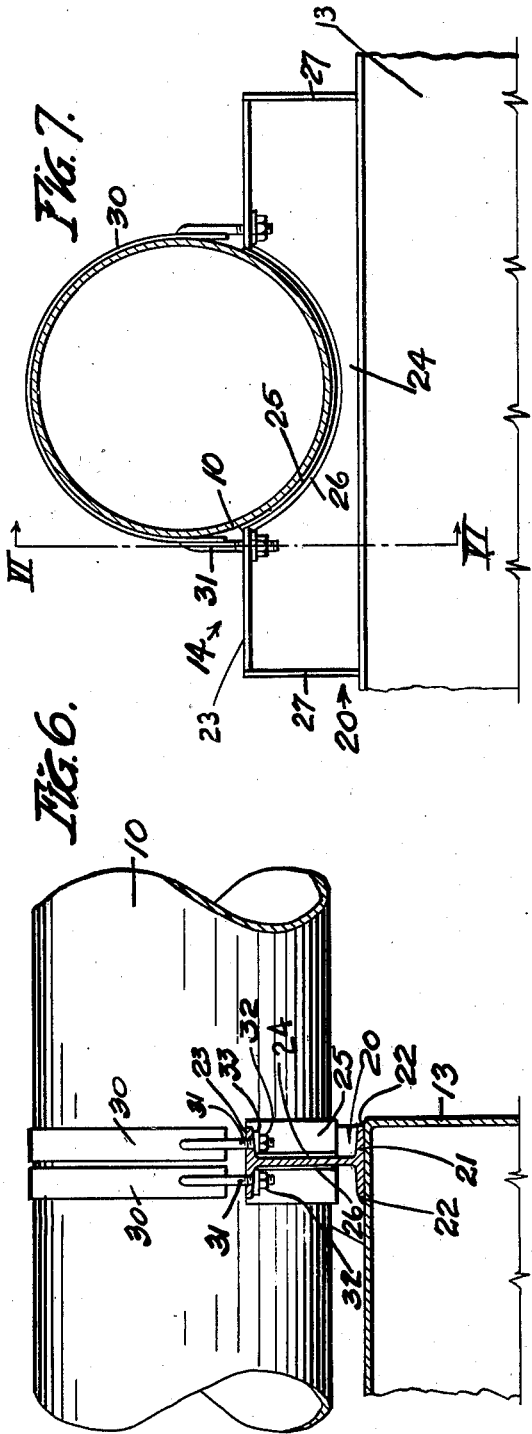
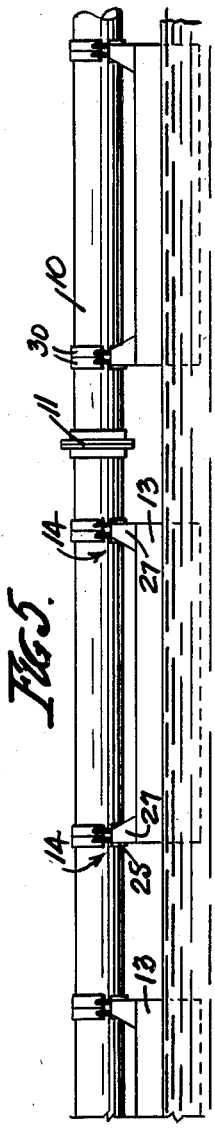
INVENTOR
DONALD W. OSWALT Patented May 10, 1938

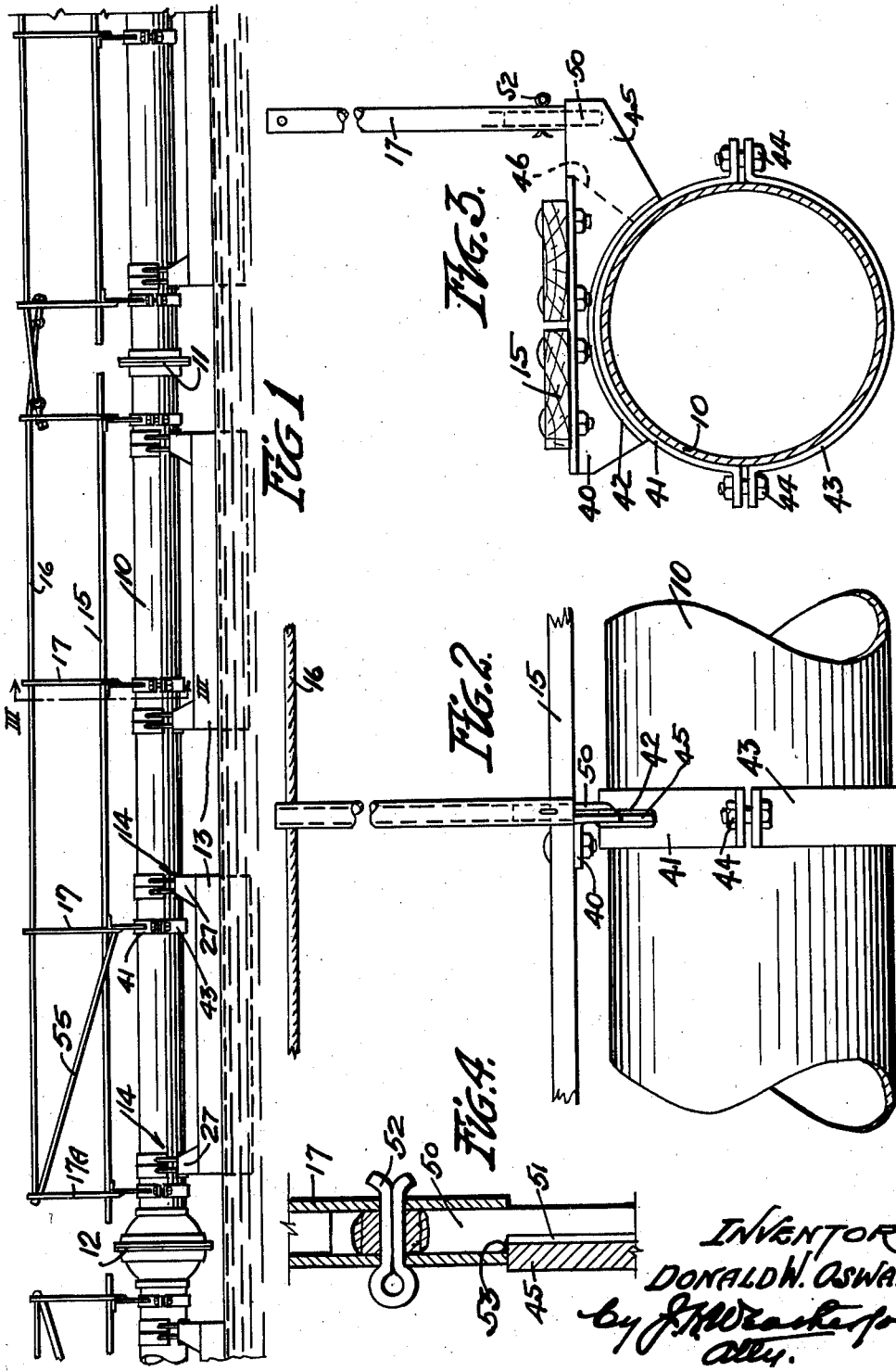

2,117,008

UNITED STATES PATENT OFFICE 2,117,008

SUPPORT FOR DREDGING CONDUITS

Donald W. Oswalt, Memphis, Tenn.

Application January 5, 1938, Serial No. 183,447

5 Claims. (Cl. 37—72)

This invention relates to hydraulic discharge pipes or conduits for dredging machines or the like and particularly to devices for supporting and anchoring such pipes to the supports and to means for making such pipes accessible when in use.

In dredging it is usually necessary to carry the discharge from the dredge through pipes of considerable length, in order to reach a point where the solid material may be discharged and deposited, a large portion of these lines usually being across bodies of water.

It is usual to support such pipes on pontoons and the present invention contemplates the use of such pontoons. These pontoons may be of wood, but under modern conditions metal pontoons have been found more satisfactory, but supporting the pipes on and anchoring them to the pontoons has been found difficult, and substantially impossible in view of the shifting thrusts exerted between pontoons on the rigid pipe line. Also the provision of walk-ways and guard-rails therefor have been similarly rendered extremely difficult.

The objects of the present device are primarily to provide suitable means for effecting the rigid anchorage of the pipe to each of the pontoons; a further object is to provide simple and efficient walk-way structures and guard-rails to provide access to the pipe line. A further object is to provide simple and effective means for securing a discharge pipe to a plurality of supporting pontoons, whereby a self-contained unit structure is produced.

The means by which the foregoing and other objects are accomplished and the method of their accomplishment will readily be understood from the following specification on reference to the accompanying drawings, in which:

Fig. 1 is a side elevation of a plurality of pontoons, with a pipe line supported thereon, and showing the anchoring devices, the walk-way and the guard-rail therefor.

Fig. 2 is an enlarged fragmentary side elevation of the pipe and walk-way, the support for the walk-way, and a post of the hand-rail.

Fig. 3 is a section transverse to the pipe showing the same detail.

Fig. 4 is an enlarged sectional elevation of a fragmentary portion of the rail post and stub.

Fig. 5 is a side elevation showing the pipe supported on the pontoons, but without the walkway and hand-rail.

Fig. 6 is an enlarged sectional side elevation taken as on the line VI—VI of Fig. 7, showing a fragmentary portion of the pipe and pontoon and the pipe support and anchoring means.

Fig. 7 is a sectional elevation transverse to the pipe showing the same detail.

Referring now to the drawings in which the various parts are indicated by numerals:

10 is the discharge pipe, two or more lengths of which are connected by flange joints 11, into rigid pipe line sections and these sections by ball and socket joints 12. The pipe line 10 is supported on pontoons 13 by pairs of saddles 14, which are respectively disposed along the opposite edges of the pontoon. 15 is a walk-way, 16 a hand-rail, preferably a wire cable, and 17 posts supporting this hand-rail.

Each of the saddles 14, Figs. 5, 6 and 7, comprises a length of I-beam 20, which is secured directly to the deck of the pontoon by welds 22. A portion of the top flanges 23 of the I-beam and a portion of the web 24 are arcuately cut away at the midpoint of the beam, the arcuate cut extending preferably substantially more than half the depth of the beam to reduce the overturning effect due to thrust, and a plate or strap 25 preferably about the same width as the top flange width of the beam is curved to conform to the exterior diameter of the pipe and to this cut away portion of the beam to form a seat for the pipe, and is secured to the web 24 and top flanges 23 by welds 26. At each of the ends of the beam, gusset plates 27 are similarly secured by welding to the web and flanges of the I-beam and to the deck of the pontoon to brace the I-beam against transverse over-turning.

30 are a pair of straps, each having bolt ends 31 welded to their opposite ends, the straps being placed over the pipe 10 with the bolt ends depending through suitable holes in the beam flanges 23, to which flanges they are secured by nuts 32. 33 are interposed washers bevelled to conform to the under slope of the flanges 23. When the pipe is disposed on the seat 25 and is clamped thereagainst by the straps 30, it is securely anchored to this seat and acts to prevent over-turning motion of the seat and the beam with which said seat has been made integral by welding, this action being made more positive by the positioning of the pair of the seats at the respective opposite edges of the pontoon.

The walk-way 15 preferably comprises planks in pairs which are secured to and supported by angle irons 40. The vertical flanges of these angle irons are each arcuately cut away to seat on a strap 41 curved to conform to the upper half of the pipe 10, the cut-away flange being secured to this strap by welds 42. 43 are complementary straps embracing the lower half of the pipe, and 44 bolts securing the straps 41 and 43 together around the pipe and clamping them to the pipe.

The angle iron 40 has a lateral extension 45 at one side to support the hand-rail, this extension usually being a plate attached as by welding along a line 46 to the vertical flange of the angle.

50 is a stub rod secured to the extension 45 as by welds 51, and extending above the plate section to enter the lower end of the post 17, this post being a section of pipe adapted to fit closely around the stub rod 50, with a portion of its lower end resting on the extension as a support. The post 17 and the rod 50 are provided with holes which align when the post is in place to receive a cotter key 52 which retains the post in place on the rod. Preferably the lower end of the rod 50 is flattened on one side so that it seats solidly against the extension, the flattening forming a shallow shoulder 53 adapted to rest on the upper edge of the extension.

Where the pipe line is connected between two pontoons by ball and socket joint 12, the end post 17A is braced across the pontoon by a diagonal thrust brace 55, the hand rail cable 16 being secured to the upper end of the post. Where flange joints 11 occur the construction may be similar, but preferably the cable extends across to the post of the adjacent pontoon and is detachably secured to such post.

The construction effected by the spaced seats 14 integrally secured and braced at opposite edges of the pipe thereto affords a stable connecting of the pipe to the barge and through this pipe the rigid coupling of a plurality of the pontoons together into a unit.

I claim:

1. A discharge pipe for dredges or the like, comprising a plurality of rigid sections flexibly connected; each said section carried by a plurality of metal pontoons; each said pontoon having, adjacent its two opposite sides, metal beams each respectively seated on the deck of said pontoon and integrally welded thereto, the top of each beam, midway its length, being arcuately cut away conformably to the cross section of said pipe, for substantially more than half said beam depth and having a metal plate curved to conform to the external cross section of said pipe, disposed along said arcuate cut and integrally secured by welding to said beam to form a pipe seat, and a pair of straps disposed over said pipe to secure said pipe to said seat, each said strap having integral bolt ends and being secured by nuts to said beam.

2. In a dredge pipe-line, the combination with a discharge pipe and a supporting pontoon having a metal deck, of means securing said pipe to said pontoon, comprising a pair of I beams disposed along the two opposite sides of said pontoons, each said beam respectively being seated on the deck of said pontoon and having its lower flanges welded thereto, the top of said beam midway its length being arcuately cut away, conformably to the cross section of said pipe for substantially more than half said beam depth, and having a metal plate curved to conform to the external cross section of said pipe, disposed along said arcuate cut and secured by welding to said beam, a pair of straps for each said beam disposed over said pipe, each said strap having integral bolt ends depending therefrom, through holes therefor in the top flanges of said beam nuts on said bolt ends securing said ends to said flanges.

3. A discharge line for dredges, including a pipe and a supporting pontoon, said pontoon having a metal deck, and having supporting pipe saddles respectively adjacent its opposite sides, each saddle comprising a metal I beam seated on the deck of said pontoon and having its lower flanges welded thereto, the top of said beam midway its length being arcuately cut away conformably to said pipe for substantially more than half said beam depth, and having a metal plate curved to conform to the external cross section of said pipe disposed along said arcuate cut and integrally secured by welding to said beam, bracing plates disposed respectively against opposite ends of said beam and welded thereto and to said deck, and a pair of straps disposed over said pipe, each said strap having integral bolt ends and nuts, engaging said beam on opposite sides of said pipe to clamp said pipe to said saddle.

4. A discharge pipe for dredges or the like, comprising a plurality of rigid sections connected by flexible joints; each said section carried by a plurality of metal pontoons and being rigidly secured as by straps to arcuate metal seats conforming to the cross section of said pipes and integrally secured to the deck of said pontoon, there being a pair of said seats respectively along opposite edges of said pontoons; and a plurality of metal saddles spaced along the top of said pipes and secured thereto by encircling straps, walk-ways secured to said saddles, said saddles each having a lateral extension, a stub rod integrally secured to said extension and projecting thereabove, pipe posts disposed over said stubs and secured thereto by removable pins, and a cable hand rail carried by the upper end of said posts.

5. A walk and rail support for a pipe line, said support comprising a metal strap means adapted to encircle said pipe, clamping bolts therefor, an angle iron having horizontal and vertical legs, said vertical leg being arcuately cut away to conform to the curvature of said strap and secured by welding along said arcuate cut to said strap, said horizontal leg forming a seat for said walk, said vertical leg extending laterally to one side of said pipe, a vertically disposed stub rod welded to said extension and extending thereabove, a pipe-post disposed over said stub and supported by said extending leg, and a removable key securing said post to said stub rod, said post having a hole through its upper end for said rail.

DONALD W. OSWALT.